United States Patent

Sponaugle

[11] 4,144,011
[45] Mar. 13, 1979

[54] FEEDBLOCK AND DIE ASSEMBLY
[75] Inventor: Lloyd B. Sponaugle, Akron, Ohio
[73] Assignee: NRM Corporation, Tallmadge, Ohio
[21] Appl. No.: 785,879
[22] Filed: Apr. 8, 1977
[51] Int. Cl.² .................................................. B29D 7/02
[52] U.S. Cl. .............................. 425/192 R; 425/135.5; 425/461; 425/462
[58] Field of Search ............... 425/133.1, 133.5, 131.1, 425/462, 463, 190, 192 R, 191, 376 R, 327, 461; 222/14.5; 264/171, 241, 245; 137/605, 602, 599, 566, 561 A

[56] References Cited
U.S. PATENT DOCUMENTS

| | | | |
|---|---|---|---|
| 2,734,224 | 2/1956 | Winstead | 425/190 |
| 3,365,750 | 1/1968 | Donald | 425/133.1 |
| 3,399,428 | 9/1968 | Valyi | 425/327 X |
| 3,743,459 | 7/1973 | Schrenk et al. | 425/462 X |
| 4,015,926 | 4/1977 | Nehmey | 425/376 R |

Primary Examiner—Richard B. Lazarus
Assistant Examiner—Mark Rosenbaum
Attorney, Agent, or Firm—Frederick K. Lacher

[57] ABSTRACT

A feedblock for co-extrusion of a multilayer article in which a first die body has a discharge passage channel in a face of the body extending to a discharge opening. A second die body has a mating face for covering the channel in the face of the first die body to enclose the discharge passage. Feed openings are provided in the first die body and are connected to the discharge passage by flow passages in the first die body which may be provided by flow channels in the face of the first die body. The mating face of the second die body may also have a flow channel matching a discharge passage or flow channel of the first die body to provide a flow passage.

15 Claims, 10 Drawing Figures

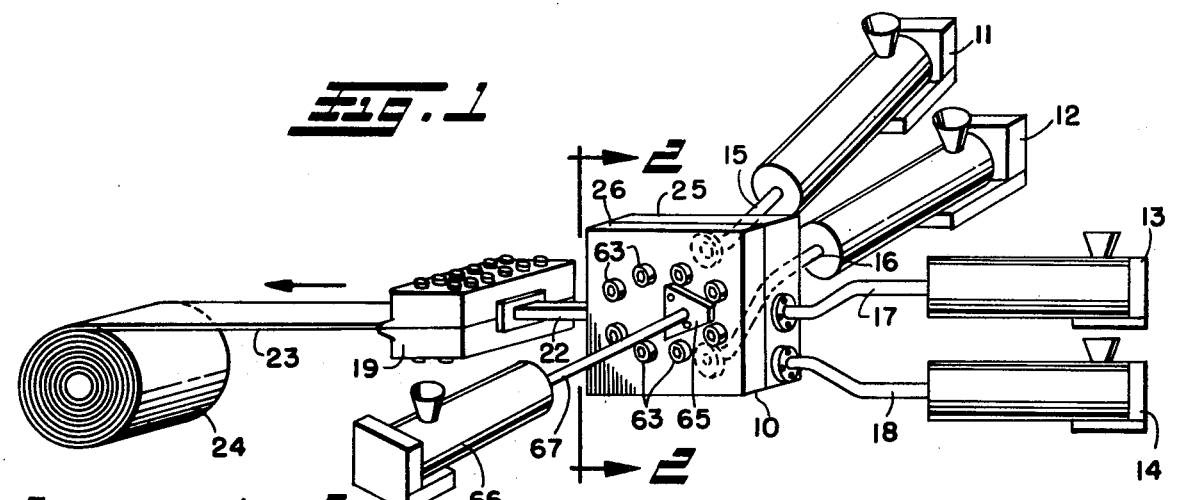
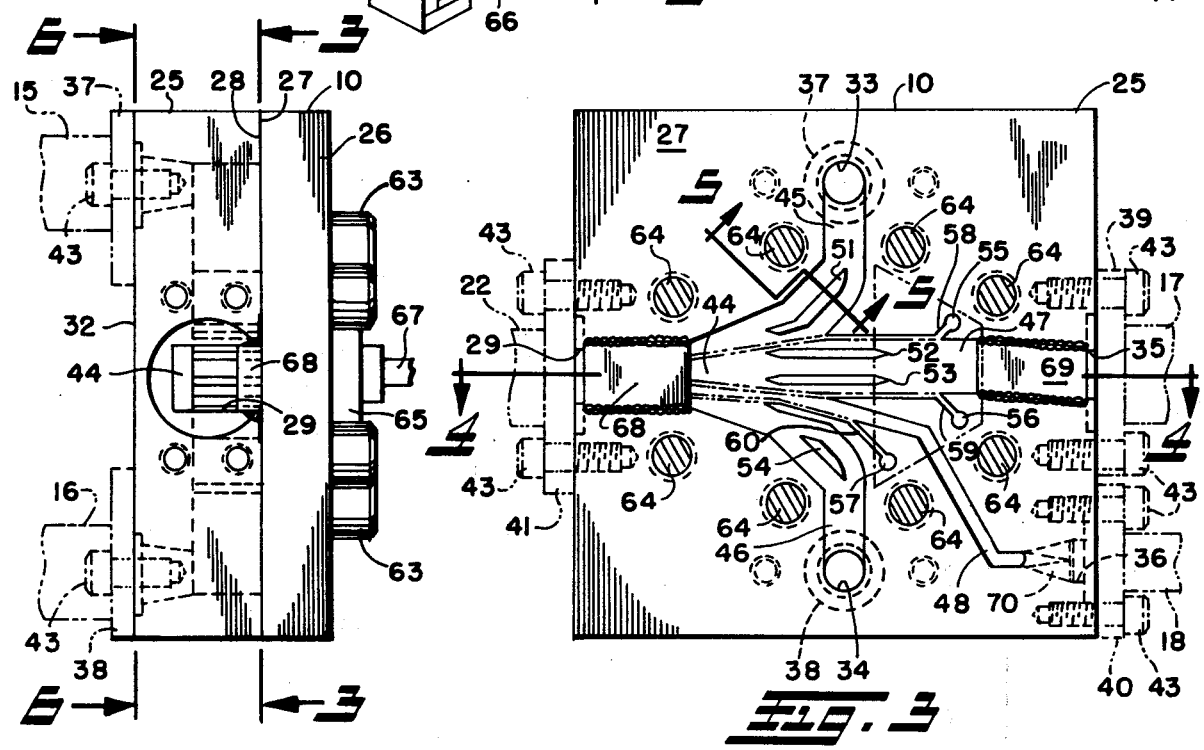
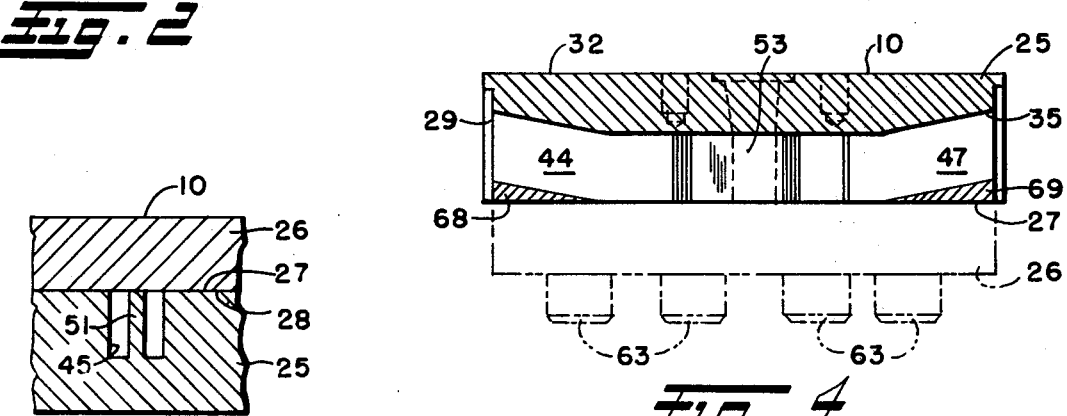

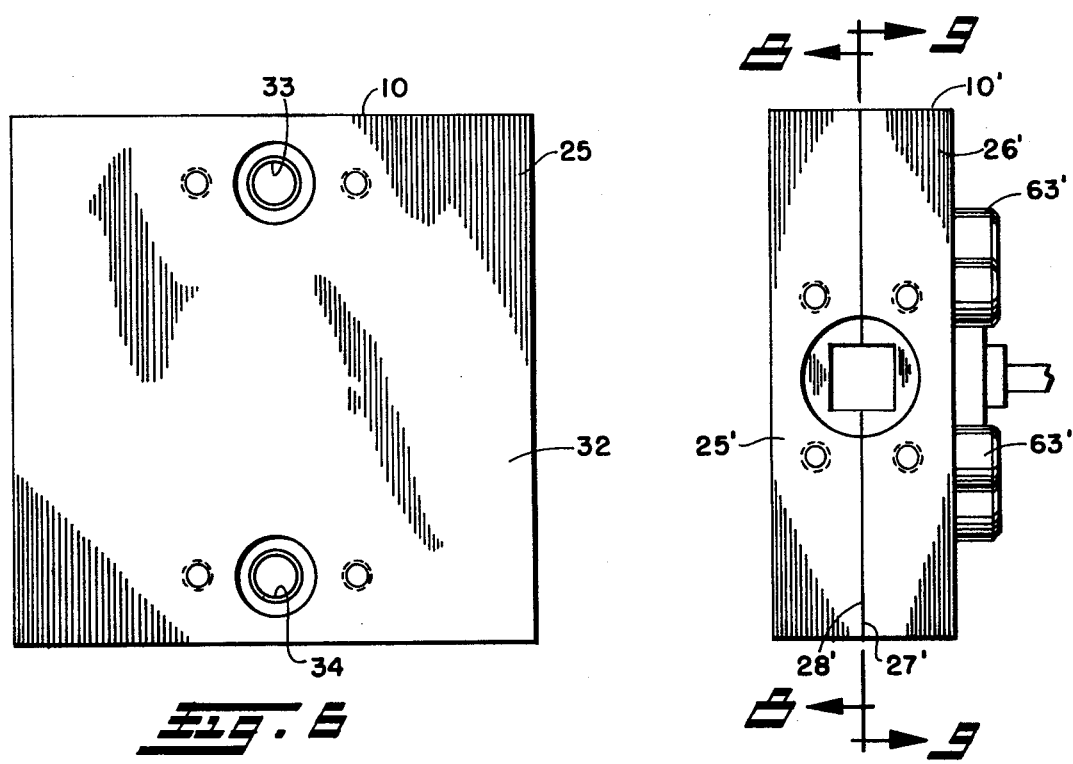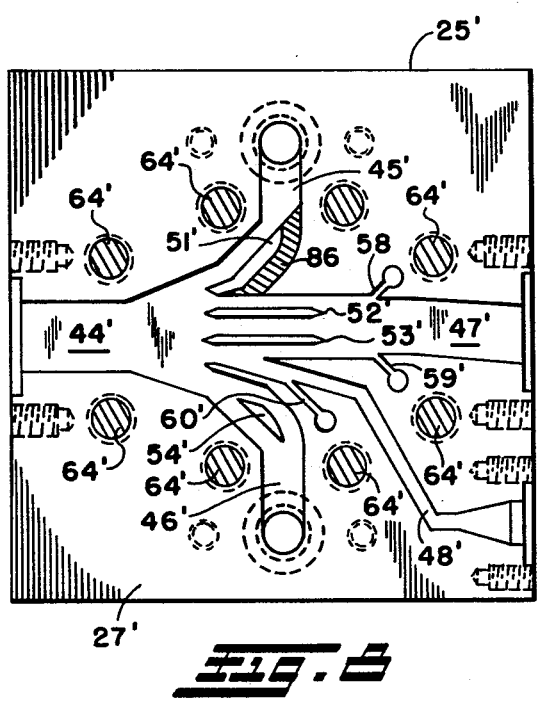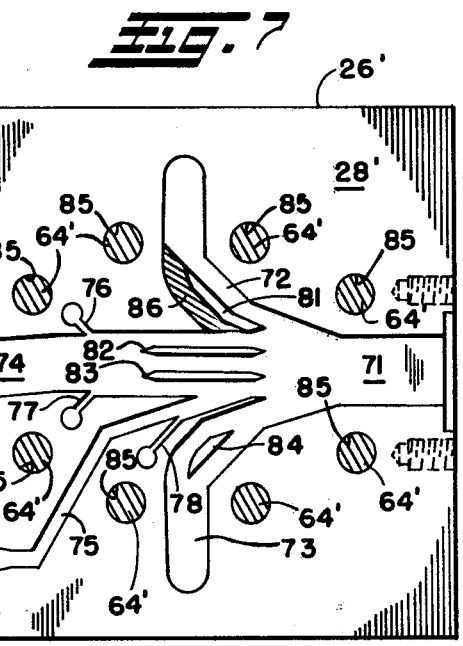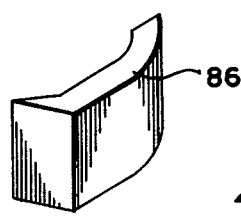

FEEDBLOCK AND DIE ASSEMBLY

BACKGROUND OF THE INVENTION

This invention relates generally as indicated to a feedblock, and more particularly to a construction for the simultaneous extrusion or co-extrusion of two or more plastic materials. It has been found that a laminated stream of plastic material may be formed in a feedblock by feeding a plurality of heat-plastified streams into the feedblock and directing them into adjacent positions in contiguous relationship to each other. The feedblocks used heretofore have had a "stacked" construction with several plates bolted together and the passages extending through the plates. Each of the plates has been machined or otherwise cut to provide the passages from the feedports to a discharge passage where the parallel plastified streams of thermoplastic resinous material are conveyed to a discharge opening.

The feedblocks of this design have been difficult and expensive to make. The bolted construction has limited the positions in which the passages from the feedports can be located. Inspection and cleaning of the feedblocks has been difficult because it has required the removal of the several plates of the stacked feedblock. The stacked construction has also required substantial thickness of the parts to provide the necessary strength and this has resulted in a relatively heavy feedblock. Because of the relatively high cost of this construction the number of feedblocks has been kept to a minimum by designing "standard" feedblocks which can be used for several applications but do not have the most efficient feedblock design for each application.

SUMMARY OF THE INVENTION

It is accordingly a principal object of this invention to provide a two-plate feedblock for co-extrusion of a multilayer stream of plastic material in which the flow channel is in the face of one die plate of the feedblock and is covered by a cover plate to enclose the discharge passage.

Another object of this invention is to provide multiple connecting passage channels in the face of one die plate with a cover plate to enclose the connecting passages for conveying plastic material from feed openings in the feedblock to the discharge passage.

A further object is to provide for fastening the die plates together for ease of assembly and disassembly.

A still further object is to provide for milling the passage channels in the face of the die plate for ease of manufacture.

Another object is to provide vanes in the passage channels for controlling the movement of the plastic material through the passages.

A further object is to provide for partially blocking a connecting passage to reduce the flow of plastic material through the passage.

A still further object is to provide matching channels in both mating faces of the die plates to provide the flow passages.

These and other objects of the present invention are achieved utilizing a two-plate feedblock with the passages in the feedblock provided by milling channels in the face of at least one die plate and covering the channels with the other plate. Removal of the cover plate provides easy access for inspection and repair. Also vanes are provided in the die plate channels and inserts may be placed between the vanes and walls of the channels to reduce the flow and thereby change the relative thickness of the layers of the article.

To the accomplishment of the foregoing and related ends, the invention, then, comprises the features hereinafter fully described and particularly pointed out in the claims, the following description and the annexed drawings setting forth in detail a certain illustrative embodiment and a modification of the invention, these being indicative, however, of but two of the various ways in which the principles of the invention may be employed.

BRIEF DESCRIPTION OF THE DRAWINGS

In the annexed drawings:

FIG. 1 is a schematic view in perspective of the feedblock of this invention showing its relation to the extruders providing the plastic material and the sheeting die and finished roll of sheet having a multilayer construction.

FIG. 2 is an end view of the feedblock taken along the plane of line 2—2 of FIG. 1 showing some of the feed conduits in phantom lines.

FIG. 3 is a sectional view taken along the plane of line 3—3 in FIG. 2 showing the face of the die plate and the flow channels in the face. The layers of material flowing through the feedblock and the feed conduits are shown in phantom lines.

FIG. 4 is a longitudinal sectional view taken along the plane of line 4—4 in FIG. 3 showing the channels milled in the face of the die plate and with the cover die plate and fasteners being shown in phantom lines.

FIG. 5 is a fragmentary sectional view showing one of the passages taken along the plane of line 5—5 in FIG. 3.

FIG. 6 is a rear elevation of the feedblock taken along the plane of line 6—6 of FIG. 2.

FIG. 7 is an end view like FIG. 2 showing a modification of the invention in which both die plates have channels in the mating faces.

FIG. 8 is a view taken along the plane of line 8—8 in FIG. 7 showing the mating face of one of the die plates.

FIG. 9 is a view taken along the plane of line 9—9 in FIG. 7 showing the mating face of the other one of the die plates.

FIG. 10 is an enlarged view in perspective of the insert shown in section in FIGS. 8 and 9.

DESCRIPTION OF THE PREFERRED EMBODIMENT

Referring to FIG. 1 a system for making laminated sheet is shown in which a feedblock 10 embodying the invention is utilized. In this system, extruders 11, 12, 13 and 14 are connected to the feedblock 10 by conduits 15, 16, 17 and 18, respectively, for conveying a plurality of heat-plastified material from the extruders to the feedblock. It is understood that although four extruders are shown, a greater or lesser number may be used with feedblocks embodying the invention but adapted for different numbers of materials being fed into the feedblock 10. From the feedblock 10 the plastic material is conveyed to a sheeting die 19 by a discharge conduit 22 having a generally rectangular cross section. The sheeting die 19 produces a laminated sheet 23 which may be wrapped in a roll 24 or in any other suitable configuration for storage and transporting the sheet. It is understood that although in the system shown the plastic material is conveyed by the discharge conduit 22 to the sheeting die 19, the feedblock 10 may also be used in a system where the plastic material is conveyed to another type of die for producing other laminated products.

The feedblock 10 as shown in more detail in FIGS. 2, 3 and 4 includes a first die body or die plate 25 and a second die body or cover die plate 26. The die plates 25 and 26 are generally rectangular in shape and of a high strength material such as steel. The die plate 25 has a substantially flat face 27 and the cover die plate 26 has a mating face 28 for engagement with the flat face of the die plate. The mating face 28 is also substantially flat; however, it may be recessed at certain portions to provide the required sealing.

As shown in FIG. 3, the die plate 25 has a discharge opening 29 positioned generally halfway between the flat face 27 and the opposite or back face 32 of the die plate. The die plate 25 also has a feed opening 33 in the back face 32 for communicating with extruder 11 through conduit 15. Feed opening 34 is located in the back face 32 of the die plate 25 for communicating with extruder 12 through conduit 16. At the opposite end of the die plate 25 from the discharge opening 29 a feed opening 35 is provided for communication with the extruder 13 through conduit 17. Below the feed opening 35, a feed opening 36 is provided for communication with the extruder 14 through conduit 18.

The conduits 15, 16, 17 and 18 for the extruders 11, 12, 13 and 14 and the discharge conduit 22 are flanged at the ends adjacent the feedblock 10 and may be clamped in sealing engagement with the die plate 25 by rings 37, 38, 39, 40 and 41 which are fastened to the die plate by screws 43 extending through the rings and in threaded engagement with the die plate.

Referring to FIGS. 3 and 4, a discharge passage channel 44 is provided in the die plate 25 adjacent the discharge opening 29. This discharge passage channel 44 may be cut in the face 27 of the die plate 25 by an end mill of a milling machine. Connecting the feed openings 33, 34, 35 and 36 with the discharge passage channel 44 are flow passage channels 45, 46, 47 and 48, respectively. These flow passage channels 45 through 48 may also be cut in the face 27 of the die plate 25 by a milling machine and extend to the discharge passage channel 44 where a configuration of the flow passage channels provides the desired layer proportions. As shown in FIG. 3, the flow passage channel 47 is larger than the flow passage channels 45 and 46 which in turn are larger than the flow passage channel 48. The larger flow passage channels 45, 46 and 47 may have equalizing vanes 51, 52, 53 and 54 located within the channels and spaced from the sides for controlling the flow of material through the channels.

In some applications it is desirable to apply a layer of adhesive or glue between the layers of plastic material and for this purpose glue feed openings 55, 56 and 57 are provided in the die plate 25 extending into the face 27. Glue flow passages 58, 59 and 60 communicate the glue from the glue feed openings 55, 56 and 57 to the flow passage channels 47 and 48. The cover die plate 26 containing corresponding glue feed openings (not shown) is fastened to the die plate 25 by nuts 63 threaded on studs 64 mounted on the die plate 25 and extending through holes in the cover die plate 26. A manifold 65 may be mounted on the cover die plate 26 and have passages in communication with the glue feed openings corresponding to the openings 55, 56 and 57 for communicating glue from a small glue extruder 66 through a conduit 67 to the glue flow passages 58, 59 and 60.

It is desirable that the discharge opening 29 and the feed openings 35 and 36 be located approximately halfway between the face 27 of the die plate 25 and the back face 32 of the die plate 25 as shown in FIG. 4. Accordingly the discharge passage channel 44 and the flow passage channels 47 and 48 are milled with an increased depth at the discharge opening 29 and feed openings 35 and 36. Cover members such as beveled plates 68, 69 and 70 are welded or otherwise fastened at the top of the channels 44, 47 and 48 as shown in FIGS. 3 and 4. The beveled plates 68, 69 and 70 have inner surfaces facing the bottom surfaces of the channels 44, 47 and 48 which are sloped away from the face 27 of the die plate 25 towards the openings. As shown in FIGS. 2 and 5, the discharge passage channel 44 and the flow passage channel 45 form generally rectangular passages when the cover die plate 26 is bolted to the die plate 25.

In operation the plasticized material is fed from the extruders 11, 12, 13 and 14 into the feedblock 10 and through the flow passage channels 45, 46, 47 and 48 into the discharge passage channel 44 providing a layered elongated body with the layers indicated by dot-dash lines in FIG. 3. The glue is fed by the extruder 66 into the manifold 65 and through glue feed openings 55, 56 and 57 to glue flow passages 58, 59 and 60 to provide the thin layers of glue between the layers of plasticized material as shown in dot-dash lines in FIG. 3. The elongated layered body is then carried by the discharge conduit 22 which also has a rectangular cross section to the sheeting die 19 as shown in FIG. 1.

Preferably the feedblock 10 is heated by heaters (not shown) which may be mounted on the cover die plate 26 and the die plate 25 either at the top, bottom or on the sides. In accordance with practices well known in the art, the sheeting die 19 may also be heated. The thickness of the layers may be determined by the size of the extruders 11, 12, 13 and 14 or the extruders may be driven at different speeds to provide different throughputs. In the preferred embodiment shown, extruders 11 and 12 are adapted for extruding a virgin styrene. Extruder 13 is adapted for extruding a reground styrene and extruder 14 is adapted for extruding polyethylene.

With this construction the feedblock 10 can be easily inspected by removing the cover die plate 26. Also the cover die plate 26 may be made of a transparent material so that the flow of the plastic material through the feedblock 10 may be observed during the actual extruding operation.

Another advantage of this construction is that the studs 64 may be mounted on the die plate 25 in a number of different locations so that the discharge passage channel 44 and the flow passage channels 45 through 48 may be located at the most advantageous positions. By using an end mill to cut the channels 44 through 48 and 58 through 60 in the face 27 of the die plate 25, the cost of manufacturing is held to a minimum permitting feedblocks 10 to be designed specifically for each application to obtain the maximum efficiency and highest quality of product.

Referring to FIGS. 7, 8 and 9, a modification is shown in which a feedblock 10' has a cover die plate 26' with a mating face 28' in which a discharge passage channel 71 and flow passage channels 72, 73, 74 and 75 are cut in the mating face of the cover die plate. Also the glue flow passages 76, 77 and 78 are cut in the mating face 28'. In addition vanes 81, 82, 83 and 84 in flow passage channels 72, 73 and 74 are located at spaced-apart positions from the sides of the channels.

The cover die plate 26' is fastened to the die plate 25' by nuts 63' threaded on studs 64' mounted on the face 27' of the die plate and extending through holes 85 in the cover die plate. When the cover die plate 26' is mounted on the die plate 25', the discharge passage channel 71 fits over the discharge passage channel 44' in the die plate 25'. Likewise the flow passage channels 72, 73, 74 and 75 and the glue flow passages 76, 77 and 78 fit over the flow passage channels 45', 46', 47' and 48' and the glue flow passages 58', 59' and 60' forming passages for the plastic material and glue.

As shown in FIGS. 8, 9 and 10, an insert 86 may be placed in flow passage channels 45' and 72 between the vanes 51' and 81 and the sides of the flow passage channels to reduce the cross section of the flow passage channel and thereby reduce the amount of material flowing through the passage. This will reduce the flow and thereby reduce the thickness of the top layer in the discharge passage formed by channels 44' and 71. It is understood that other inserts may be made like insert 86 and placed in the channels between the vanes 52', 53' and 54' in the sides of their respective flow passage channels to obtain the same reduced flow in these channels and the passages formed by the channels.

With this design shown in the embodiment of FIGS. 1 through 6 and the embodiment of FIGS. 7 through 10, a designer may start designing the feedblock at the discharge opening 29 by establishing the percentage of each layer relative to the total vertical dimension of the discharge opening. The layered proportions then determine the relative size and position of the flow passages through the feedblock and ultimately the size and location of the various feed openings. The position of the studs 64 may be moved to provide a space for the passages and the feed openings without adding to the size of the feedblock 10. All of this contributes to a smaller and less expensive feedblock design.

I claim:

1. A feedblock and die assembly for co-extrusion of a multilayer article comprising a first die body having a discharge passage channel in a first face of said body, a cover die plate having a mating face for engagement with said first face to cover said discharge passage channel and provide a single enclosed discharge passage, a plurality of feed openings in said die body in communication with said discharge passage, connecting passages in said feedblock between said feed openings and said discharge passage for communicating material from said feed openings to said discharge passage, a discharge opening in said feedblock in communication between said discharge passage and a discharge conduit connected between said die body and a die, and said cover die plate being connected to said die body by fasteners positioned so that said cover die plate can be removed without breaking the connection between said die body and said discharge conduit.

2. The feedblock and die assembly of claim 1 wherein said feed openings are in said first die body and said first die body has connecting passage channels in said first face providing enclosed connecting passages when said mating face of said cover die plate is in engagement with said first face.

3. The feedblock and die assembly of claim 2 wherein at least one of said connecting passage channels has vanes spaced from the sides of the channel for equalizing the flow of material through said passages.

4. The feedblock and die assembly of claim 3 wherein said die body includes an insert positioned in one of said passage channels between one of said vanes and an opposing side of the channel for partially blocking one of said passage channels to reduce the flow of material through the corresponding one of said passages.

5. The feedblock and die assembly of claim 2 wherein said cover die plate has corresponding mating connecting passage channels in said mating face to fit over said connecting passage channels in said first face and provide a portion of said connecting passages.

6. The feedblock and die assembly of claim 5 wherein the thickness of said first die body is substantially the same as the thickness of said cover die plate.

7. The feedblock and die assembly of claim 1 wherein said first die body and said cover die plate are fastened together by fasteners extending between said passages.

8. The feedblock and die assembly of claim 7 wherein said fasteners are threaded members extending through holes in said cover die plate body and mounted on said first die body.

9. The feedblock and die assembly of claim 1 wherein said first die body is a generally rectangular first die plate and said cover die plate is generally rectangular, said first die plate having a first end face and said discharge opening being located in said first end face.

10. The feedblock and die assembly of claim 9 wherein said discharge opening is positioned generally halfway between said first face and the opposite face of said first die body and said discharge passage has a cover member in said discharge passage channel adjacent said discharge opening.

11. The feedblock and die assembly of claim 10 wherein said discharge passage channel has an increased depth at said discharge opening as measured from said first face of said first die body and the bottom surface of said channel is sloped away from said first face towards said discharge opening.

12. The feedblock and die assembly of claim 11 wherein said cover member has an inner surface facing the bottom surface of said channel and said inner surface is sloped towards said discharge opening.

13. The feedblock and die assembly of claim 1 wherein said first die body is metal and said discharge passage channel has a cross section which can be milled in said first face.

14. The feedblock and die assembly of claim 3 wherein said discharge passage channel has a generally rectangular cross section.

15. The feedblock and die assembly of claim 1 wherein said cover die plate has a corresponding mating discharge passage channel in said mating face to fit over said discharge passage channel in said first face and provide a portion of said discharge passage.

* * * * *

UNITED STATES PATENT OFFICE
CERTIFICATE OF CORRECTION

Patent No. 4,144,011          Dated March 13, 1979

Inventor(s) Lloyd Blair Sponaugle

It is certified that error appears in the above-identified patent and that said Letters Patent are hereby corrected as shown below:

Claim 8, line 26, after "cover die plate" delete "body".

Claim 14, line 53, substitute numeral --13-- for numeral "3".

Signed and Sealed this

Twelfth Day of June 1979

[SEAL]

Attest:

RUTH C. MASON  
Attesting Officer

DONALD W. BANNER  
Commissioner of Patents and Trademarks